United States Patent [19]
Jilek

[11] Patent Number: 5,837,970
[45] Date of Patent: Nov. 17, 1998

[54] METHOD AND APPARATUS FOR CONTROLLED DELIVERY OF HEAT ENERGY INTO A MECHANICAL DEVICE

[76] Inventor: Gerard T. Jilek, 775 Oak Knoll Dr., Ashland, Oreg. 97520-1446

[21] Appl. No.: 425,799

[22] Filed: Apr. 20, 1995

[51] Int. Cl.[6] ............................................. F16K 49/00
[52] U.S. Cl. .................. 219/201; 219/530; 137/341; 251/369; 165/DIG. 512; 165/133
[58] Field of Search ..................... 219/201, 200, 219/530, 540, 536, 207; 137/341; 165/DIG. 512, 133; 251/369, 12, 142, 149.8, 11; 123/549; 261/DIG. 20, 142

[56] References Cited

U.S. PATENT DOCUMENTS

| | | | |
|---|---|---|---|
| 1,952,589 | 3/1934 | Guenst | 219/536 |
| 2,680,449 | 6/1954 | Toulmin, Jr. | 137/341 |
| 3,080,882 | 3/1963 | Baker | 137/341 |
| 3,349,722 | 10/1967 | Davis | 219/536 |
| 3,538,302 | 11/1970 | Volling | 219/201 |
| 3,575,199 | 4/1971 | Beattie | 137/341 |
| 3,658,085 | 4/1972 | Cannella | 137/341 |
| 3,733,459 | 5/1973 | Lengstorf | 219/201 |
| 4,482,801 | 11/1984 | Habata et al. | 219/540 |
| 5,256,857 | 10/1993 | Curhan et al. | 219/202 |
| 5,413,139 | 5/1995 | Kusumoto et al. | 137/341 |
| 5,485,542 | 1/1996 | Ericson | 219/201 |

FOREIGN PATENT DOCUMENTS

| | | |
|---|---|---|
| 3633682 | 4/1988 | Germany . |
| 4-64788 | 2/1992 | Japan . |
| 6-201065 | 7/1994 | Japan . |

*Primary Examiner*—John A. Jeffery
*Attorney, Agent, or Firm*—Keith A. Cushing

[57] ABSTRACT

A heater includes an aluminum die cast body defining an enclosure and an adaptor block. A heating element within the enclosure activates, under control of an associated heat sensing device, a heating element within the enclosure to transfer heat energy into the adaptor block. The adaptor block, including features specific to a given mechanical device, e.g., pneumatic valve or pump, transfers the heat energy into the mechanical device to avoid a frozen condition resulting from, for example, sudden expansion of air when passing through the device.

2 Claims, 4 Drawing Sheets

METHOD AND APPARATUS FOR CONTROLLED DELIVERY OF HEAT ENERGY INTO A MECHANICAL DEVICE

BACKGROUND OF THE INVENTION

The present invention relates generally to control apparatus, and particularly to heating apparatus for mechanical devices.

In many industrial applications, e.g., a plywood lathe or lumber sorting assemblies, air cylinders move other mechanical devices. Poppet valves control the air cylinders by selectively passing air pressure within a pneumatic circuit in implementation of a given air cylinder control function. Poppet valves must move a large volume of air into or out of an air cylinder or through a portion of a pneumatic circuit. Poppet valves must be fast acting valves accomplishing large quantity movement of air rapidly. As a result, poppet valves significantly expand air during operation and thereby experience significant decrease in temperature. When ambient air temperature is insufficient to deliver a counterbalancing magnitude of heat energy, poppet valves can freeze. It is desirable, therefore, to provide a flow of heat energy to a poppet valve. The subject matter of the present invention addresses the problem of delivering heat energy into, for example, a poppet valve. Similar considerations apply to other pneumatic devices, for example, pneumatic pumps where sudden expansion of air results in loss of heat energy relative to the body of the pneumatic pump.

Apparatus and methods for maintaining heat energy flow into a poppet valve have varied. These methods and apparatus include an enclosure with lamps therein, open flame, heat tape, and silicon rubber heating mats.

The subject matter of the present invention provides method and apparatus for controllably applying heat energy to a mechanical device.

SUMMARY OF THE INVENTION

A heater according to the present invention includes a heat conducting body including a mounting surface corresponding to a mounting site for a mechanical device, e.g., a poppet valve. A heating element bears against the heat conducting body, and a control element selectively activates the heating element to deliver heat energy into the body, and thereby into the mechanical device. According to one aspect of the invention, the heat conducting body includes an enclosure containing the heating element and further includes an adaptor block including the mounting surface. Efficient heat transfer from the enclosure to the adaptor block is supported by forcing, by appropriate coatings, heat transfer in one direction from the enclosure to the adaptor block, and further by insulating exterior surfaces of the heat conducting body.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
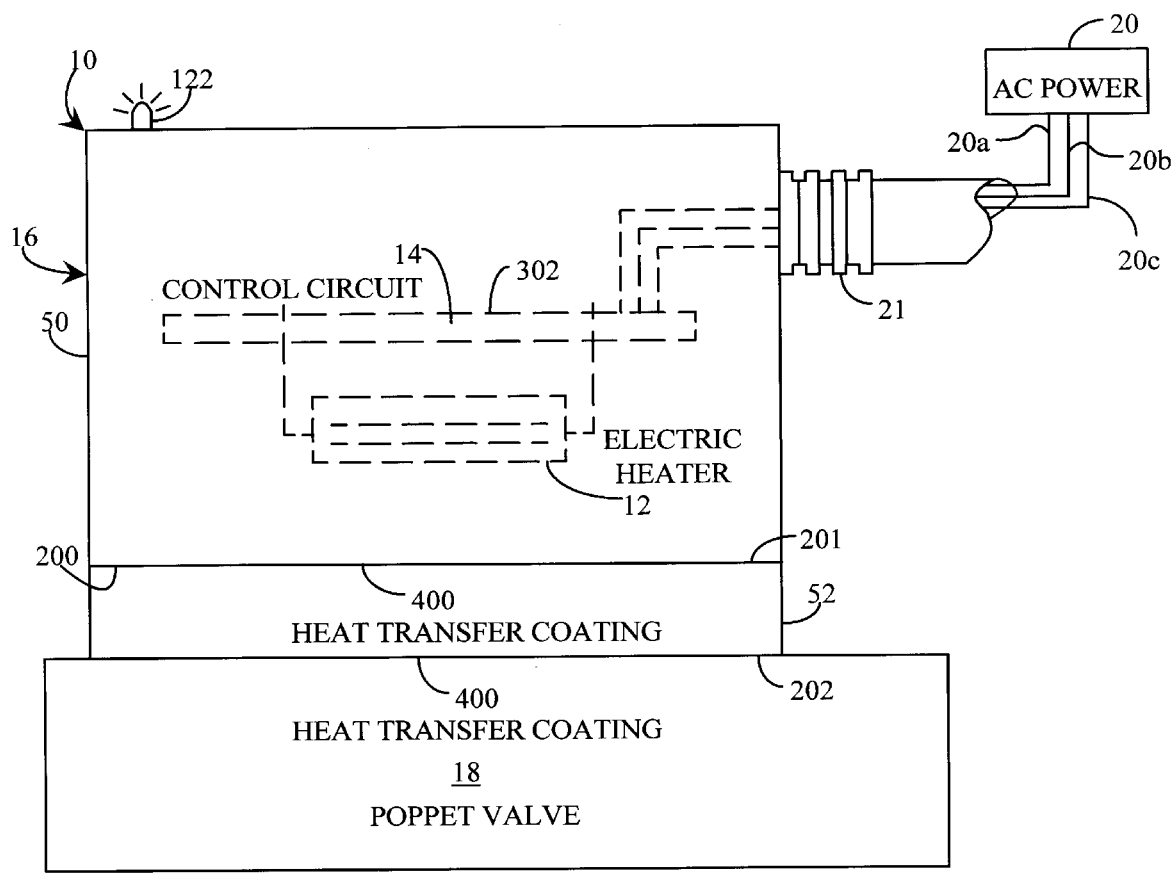
FIG. 1 illustrates a valve heater according to a preferred embodiment of the present invention as attached to a poppet valve and an AC power source.

FIG. 1 illustrates a valve heater 10 according to a preferred embodiment of the present invention. Valve heater 10 includes a heater element 12, a control circuit 14 driving heater element 12, and an aluminum die-cast body 16 containing circuit 14 and heater element 12. Body 16 mounts to a poppet valve 18 and protects valve 18 against a frozen valve condition. Valve heater 10 couples electrically to an AC power source 20 through a conduit 21 threadably engaging body 16. AC power source 20 provides power conductors 20a and 20b and a ground conductor 20c. Valve heater 10 monitors temperature conditions and, when needed, activates, by way of control circuit 14, heater element 12 to deliver heat energy into valve 18.

Temperature conditions are monitored internally, i.e., within body 16. Once heater 10 is activated and the temperature sensing device placed in operation within heater 10, valve heater 10 is maintained at a pre-set temperature. The sensor device, discussed more fully hereafter, is an internal sensor, and does not necessarily reflect temperature outside heater 10. The primary reason for using an internal, rather than an external, temperature sensor is to accurately monitor the heated body, i.e., poppet valve 18, and maintain the temperature of poppet valve 10 below a critical 140 degrees fahrenheit, which is the classified flash-point for a flammable hazardous material. Use of an internal temperature sensor also protects the sensor against environmental conditions, such as a lumber mill in which wood dust and naturally-occurring terpenes are continually dispersed in the air and collect on the surfaces of equipment. These specific products found in such environments have flashpoints in the 140 degree fahrenheit range.

Figure 3:
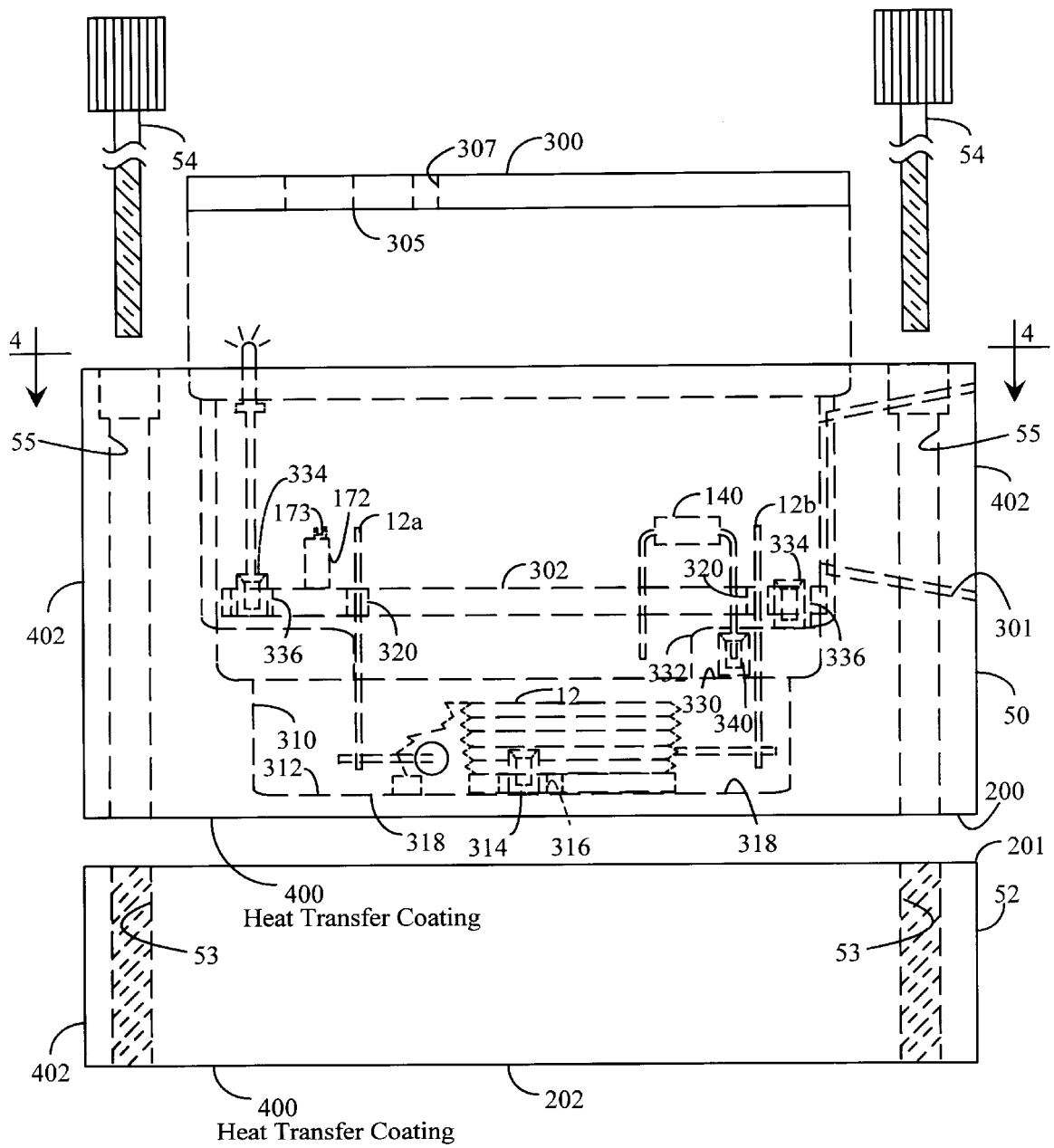
FIG. 3 is a partially exploded view of the valve heater of FIG. 1.

Body 16 includes an enclosure 50 and an adaptor block 52 joined in face-to-face relation by bolts 54 (FIG. 3). Enclosure 50 contains heating element 12 and control circuit 14. Adaptor block 52 is specific to a given valve 18, i.e., includes features necessary to closely receive and make mechanical contact with valve 18 to deliver heat energy and to mount upon valve 18. Enclosure 50 and the associated control circuit 14 and heating element 12 attach to a selected one of an inventory of adaptor blocks 52. In this manner, enclosure 50 may be used for a variety of valve 18 configurations by selection of an appropriate adaptor block 52.

Adaptor block 52 mounts to valve 18 by removing the bolts in the exhaust poppet cover and removing the paint on the surface of the exhaust poppet cover by lightly sanding the surface thereof with fine sandpaper. Once this surface is relatively flat and the paint removed, a thermal transfer compound, such as EG & Wakefield Engineering 120 Series Thermal Joint Compound, is applied between the surface of the adaptor and the valve exhaust poppet cover. Bolts supplied with the adaptor 52 are then used to remount assembly to the valve 18.

Heating element 12 is not a conventional heating device, but rather a power resistor such as available from manufacturer Dale under product number RH-25. A traditional heating element design calls specifically for generation of heat energy. Heating element 12 under the present invention, however, controllably generates heat as a by-product of its intended function when operated beyond its normal power resistor specifications as suggested by the manufacturer. By forcing element 12 to operate at higher wattage levels than ordinary power resistor operation, element 12 controllably and quickly generates large magnitude heat energy. Control circuit 14, by means of feedback relative to a temperature sense function, allows generation of significant heat energy above the rated capacity of element 12 but in a well regulated manner.

Figure 2:
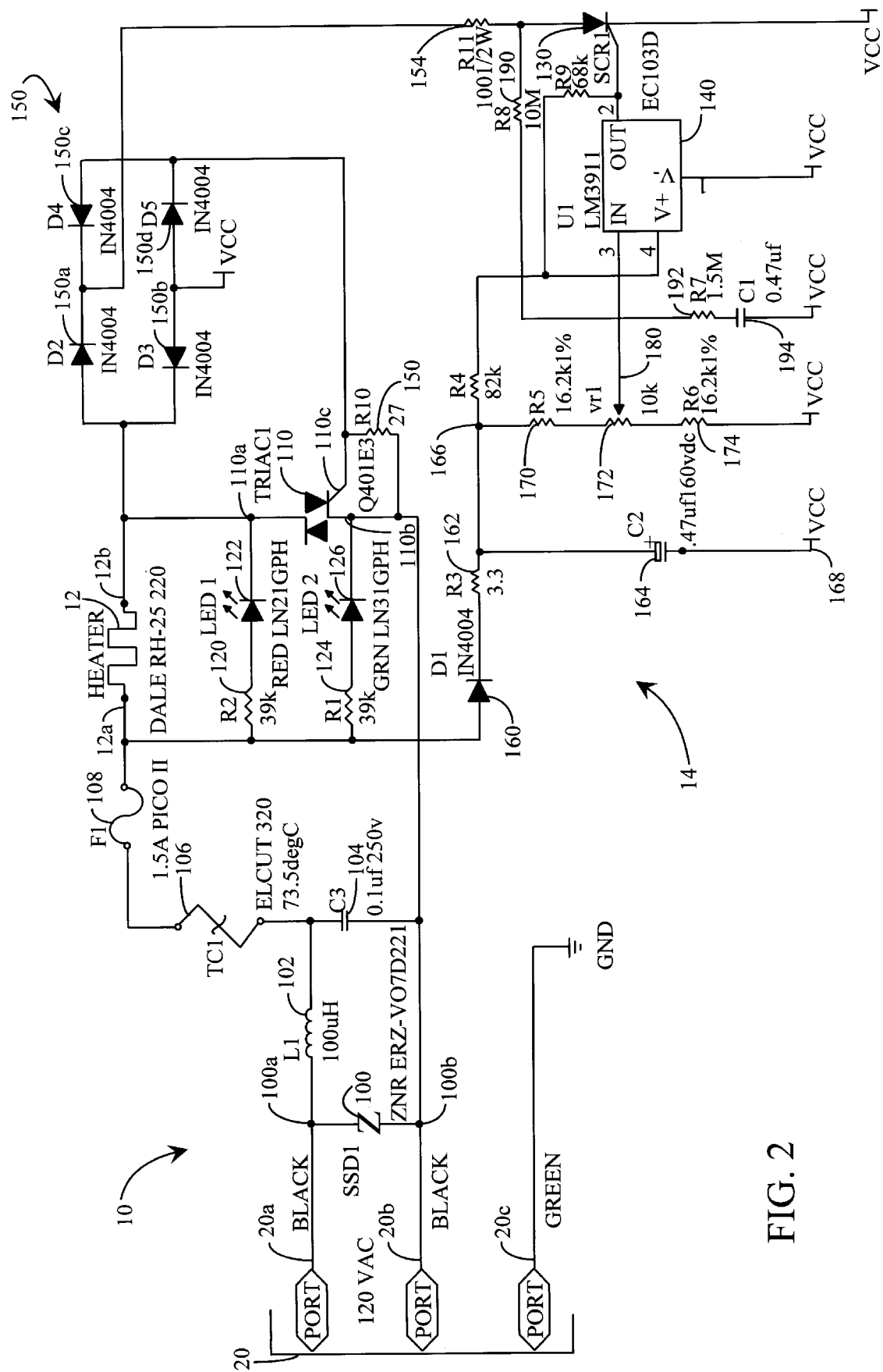
FIG. 2 illustrates schematically electrical circuitry driving a heater element of the valve heater of FIG. 1.

FIG. 2 illustrates by electrical schematic the valve heater 10 as coupled to AC power source 20 and including heater element 12 and control circuit 14. Power conductors 20a and 20b of control circuit 14 apply to respective terminals of surge suppression element 100. Terminal 100a of suppression element 100 couples to power conductor 20a and to a first terminal of an inductor 102. The other terminal 100b of suppression element 100 couples to power conductor 20b and to a first terminal of a capacitor 104. The remaining terminals of inductor 102 and capacitor 104 tie together at a thermal fuse 106. Thermal fuse 106 then couples in series through a current fuse 108 to a heater element 12 terminal 12a.

Upon energizing circuit 14 with AC power source 20, element 100 provides surge suppression against incoming noise on the 120 volt power conductors 20a and 20b. Inductor 102 and capacitor 104 form an LC network filtering RFI and EMI signals as may be generated by operation of a triac 110 of circuit 14. Thermal fuse 106 opens at 73.5 degrees celsius and provides thermal protection to valve heater 10 in the event of a runaway thermal condition. Current fuse 108, a 1.5 AMP fuse, provides current protection for control circuit 14.

Resistor 120 and red LED 122 provide a visual indication of the operation of heating element 12a. The series combination of resistor 120 and LED 122 ties across heater terminals 12a and 12b. Activation of LED 122 indicates active heating at element 12. Resistor 124 and green LED 126 provide a visual indication of power through the fuses 106 and 108. The series combination of resistor 124 and LED 126 ties across heater terminal 12a and power conductor 20b. Activation of LED 126 indicates circuit 14 is powered and ready to operate.

Triac 110 couples at a first terminal 110a to heater terminal 12b and at a second terminal 110b to power conductor 20b. Triac 110 provides direct control over operation of heater element 12a. An SCR 130, controlled by an integrated circuit 140, triggers triac gate 110c. In the illustrated embodiment of the present invention, integrated circuit 140 is a National Semiconductor Temperature Controller available under part number LM3911. Integrated circuit 140 provides an accurate temperature measurement and control system on a single integrated chip including a temperature sensor, a stable voltage reference, and an operational amplifier. Resistor 150, coupling across gate 110c and terminal 110b of triac 110, is a pull-down resistor.

Gate trigger circuit 150, including diodes 150a–150d forming a diode bridge, couples triac 110 and SCR 130. Resistor 154, interposed between gate trigger circuit 150 and SCR 130, controls the magnitude of current allowed across SCR 130. SCR 130 switching affects the current balance within the diode bridge formed by diodes 150a–150d. When SCR 130 conducts, triac 110 is turned on. Conversely, when SCR 130 opens, triac 110 is turned off.

A series combination of diode 160, resistor 162 and capacitor 164 tied between heater terminal 12a and reference voltage VCC 168, provides an IC power supply terminal 166. Terminal 166 interconnects resistor 162 and capacitor 164. Power supply terminal 166 couples through a series combination of resistor 170, variable resistor 172, and resistor 174 to reference voltage VCC 168. Variation in resistor 172 provides a variable reference voltage 180. Reference voltage 180 provides an input voltage or set point to integrated circuit 140 establishing a temperature reference for driving the switching function of SCR 130. When the detected temperature is below the temperature set point established by reference voltage 180, SCR 130 conducts. When SCR 130 conducts, it gates triac 110 into an ON state and heating element 12 receives electrical current and delivers heat energy to valve 18 (FIG. 1). As the detected valve heater 10 temperature rises above the set point, established by reference voltage 180, integrated circuit 140 turns off SCR 130, thereby switching triac 110 to an OFF state. In the OFF state, triac 110 prevents flow of current through heater element 12 and terminates delivery of heat energy to valve 18 (FIG. 1).

A series combination of resistor 190, resistor 192, and capacitor 194 couples between SCR 130 and reference voltage VCC 168. The circuit node between resistors 190 and 192 ties to reference voltage 180. This provides hysteresis in the feedback loop of a comparator (not shown) contained within integrated circuit 140. A four degree celsius hysteresis is suggested in the feedback loop for circuit 140 to avoid oscillation of circuit 140 in seeking a given temperature set point.

Figure 4:
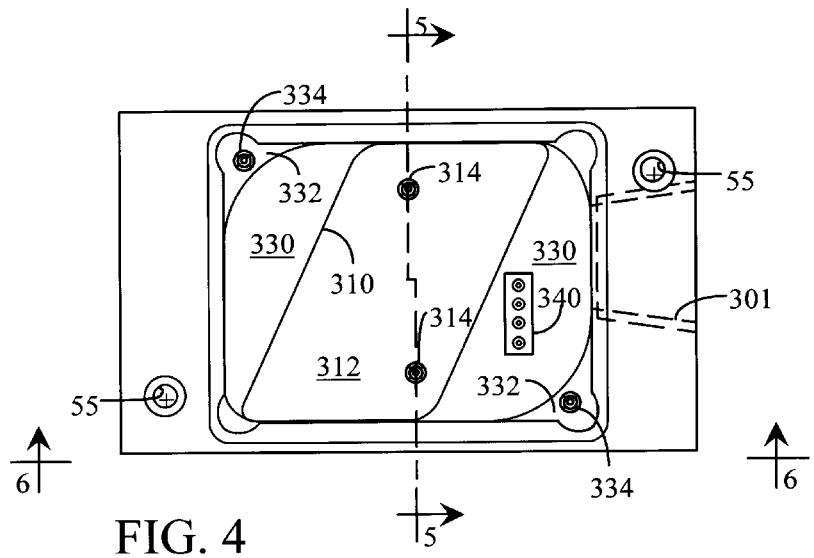
FIG. 4 is a top view of the valve heater as taken along lines 4—4 of FIG. 3.
Figure 5:
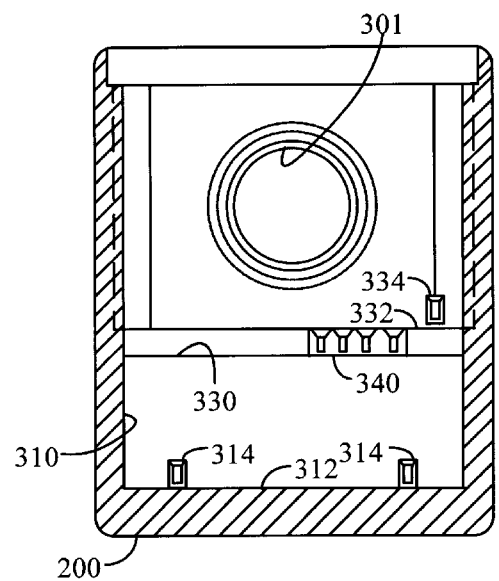
FIG. 5 is a sectional view of the valve heater as taken along lines 5—5 of FIG. 4.
Figure 6:
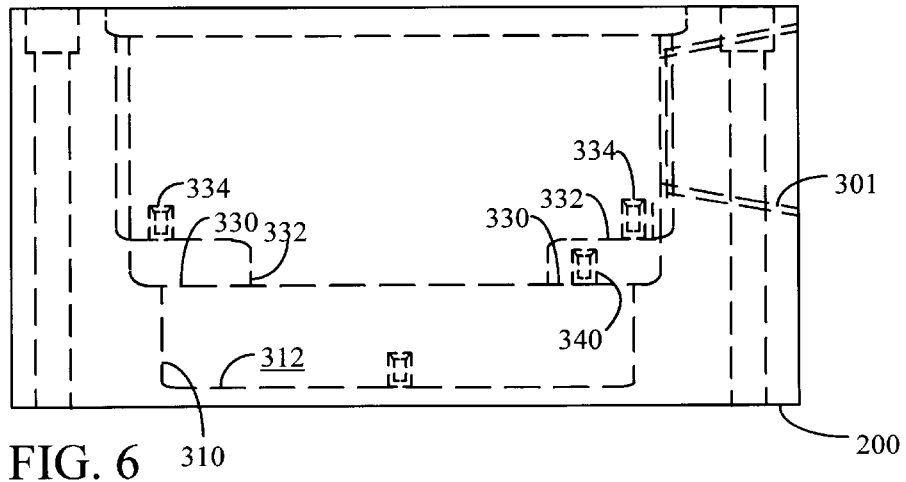
FIG. 6 is a side view of the valve heater as taken along lines 6—6 of FIG. 4.

FIGS. 3–6 illustrate in more detail features of enclosure 50 and its relationship to a printed circuit board 302, heating element 12, and efficient construction and assembly of valve heater 10. FIG. 3 shows a side view of valve heater 10 partially disassembled, i.e., with a cover plate 300 removed from enclosure 50 and with bolts 54 removed from thread engagement at threaded apertures 53 of adaptor block 52 and removed from bores 55 of enclosure 50. FIG. 3 illustrates the printed circuit board 302, carrying control circuit 14, as mounted within enclosure 50 and coupled to terminals 12a and 12b of heating element 12. FIG. 4 illustrates a top view of enclosure 50, but without including heating element 12 or circuit board 302. FIGS. 5 and 6 are sectional views taken from FIG. 4.

With reference to FIGS. 3–6, heating element 12 resides within a well 310 of enclosure 50. Well 310 defines a most-deep surface 312 including a pair of upstanding bosses 314 extending therefrom. Each boss 314 extends into a corresponding one of mounting apertures 316 (FIG. 3) of heating element 12. A thin layer of thermal potting compound 318, such as Castall, Inc., product no. S-1378FR, is interposed between heating element 12 and surface 312. With heating element 12 so positioned upon surface 312, bosses 314 are "swagged" to secure heating element 12 within well 310. Terminals 12a and 12b of heating element 12 extend upward to electrically couple to circuit board 302, i.e., by insertion of terminals 12a and 12b through and soldering at corresponding apertures 320 of circuit board 302.

Intermediate surfaces 330 lie next to the opening of well 310. At slightly higher elevation relative to surfaces 330, surfaces 332 receive circuit board 302 thereon. Each surface 332 includes a boss 334 extending upward therefrom, and passing into a corresponding aperture 336 of circuit board 302. Circuit board 302 mounts within enclosure 50 by then "swaging" bosses 334. A threaded aperture 301 in enclosure 50 threadably receives conduit 21 (FIG. 1) for coupling circuit board 302 to AC power source 20.

One of surfaces 330 includes an upstanding boss 340 positioned to receive certain terminals of integrated circuit 140. More particularly, boss 340 includes, or may be later drilled to include, four apertures suitably aligned and dimensioned to receive the temperature sensing terminals of integrated circuit 140 (FIG. 3). In this manner, a thermal coupling exists between enclosure 50 and integrated circuit 140.

Cover 300 includes two apertures 305 receiving therethrough the light emanating portion of LEDs 122 and 126. Also, cover 300 includes an aperture 307 aligned with adjustment screw 173 of variable resistor 172. In this manner, one calibrates the temperature set point provided by variable resistor 172, and thereby dictates the switching function provided for heating element 12 relative to sensed temperature.

Body 16 and other metal parts are finished in several steps. The first finishing process is an allodizing process. The use of allodizing seals the aluminum against most corrosion without actually creating an oxide on the surface of the metal, such as would occur in an anodizing process. With no oxide on the surface of body 16, optimum heat transfer characteristics of the aluminum body 16 are not only maintained, but considered enhanced.

The next step coats surface 200 of enclosure 50 to better transmit heat energy from body 16 to adaptor block 52. Surface 200 is coated with a heat transfer control formulation 400 available from manufacturer Northwest Industrial Coatings under product name TCIII. Formulation 400 forces heat transfer in one direction, i.e., out of enclosure 50 and into adaptor block 52. Adaptor block 52 also has a surface 202 coated with formulation 400 directing heat energy into poppet valve 18. Surface 200 of enclosure 50 and surface 201 of adaptor block 52 bear against each other in tight, direct face-to-face contact. Surface 201 is an allodized surface, considered an efficient receptor for the heat energy coming from surface 200 via formulation 400. Heat energy efficiently moves from surface 200 of enclosure 50 to surface 201 of adaptor block 52 by way of the intervening formulation 400. Adaptor block 52 in turn transfers heat energy to valve 18 via surface 202 and intervening formulation 400 by mechanical coupling thereto.

The final phase of finishing for enclosure 50 coats the exterior surfaces of enclosure 50 and adaptor block 52 with an insulating coating 402. This further enhances movement of heat energy from valve heater 10 into valve 18.

Once valve heater 10 is assembled, enclosure 50 is filled or "potted" with a thermal and environmental enhancement material. Such potting material is available, for example, from Castall, Inc., under product number S-1378FR. An alternative material of higher thermal transfer characteristics is Castall product number S-1313.

Thus, improved method and apparatus for controlled delivery of heat energy into a mechanical device have been shown and described. The illustrated heater is mechanically coupled to a mechanical device, for example, a pneumatic device experiencing sudden heat loss due to sudden expansion of air, and maintains the temperature of such mechanical device by delivering heat energy thereto when appropriate under controlled conditions by monitoring temperature of the body and activating a heat element in controlled fashion. Under the present invention, a power resistor operated out of its normal specification provides a mechanism for controlled and rapid delivery of heat energy into the mechanical device.

It will be appreciated that the present invention is not restricted to the particular embodiment that has been described and illustrated, and that variations may be made therein without departing from the scope of the invention as found in the appended claims and equivalents thereof.

What is claimed is:

1. A valve heater for delivering heat energy into a separate valve, the valve having a mounting site, the heater comprising:

a heat conducting body, said body including at least an adapter block portion and an enclosure portion selectively attachable and detachable relative to the other, said adapter block portion of said body including a mounting surface adapted to be matingly corresponding in shape to a mounting site of a valve, said enclosure portion including a heat dissipation surface, said adapter block portion including a heat collecting surface, said heat dissipation surface and said heat collecting surface being held in face-to-face relation, said heat dissipation surface comprising a first coating forcing heat transfer thereat away from said enclosure portion, said heat collecting surface comprising a second coating forcing heat transfer thereat into said adaptor block portion;

a heating element bearing against said body, said enclosure portion containing said heating element; and a control element selectively activating said heating element to deliver heat energy into said body and into a valve when said valve heater is mounted to a valve.

2. In combination, a valve and a separate valve heater, the valve undergoing temperature drop during operation and including a mounting site, the valve heater comprising:

a heat conducting body, said body including at least an adapter block portion and an enclosure portion selectively attachable and detachable relative to the other, said adapter block portion of said body including a mounting surface adapted to be matingly corresponding in shape to said mounting site of said valve, said enclosure portion including a heat dissipation surface, said adapter block portion including a heat collecting surface, said heat dissipation surface and said heat collecting surface being held in face-to-face relation, said heat dissipation surface comprising a first coating forcing heat transfer thereat away from said enclosure portion, said heat collecting surface comprising a second coating forcing heat transfer thereat into said adapter block portion;

a heating element bearing against said body, said enclosure portion containing said heating element; and a control element selectively activating said heating element to deliver heat energy into said body and into said valve when said valve heater is mounted to said valve.

* * * * *